US007930260B2

(12) United States Patent
Deo et al.

(10) Patent No.: US 7,930,260 B2
(45) Date of Patent: Apr. 19, 2011

(54) SYSTEM AND METHOD FOR REAL TIME PATTERN IDENTIFICATION

(75) Inventors: Harshal Ulhas Deo, San Jose, CA (US); Brian Matthew Carnes, San Jose, CA (US); Lakshman Shyam Sundar Maddali, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 676 days.

(21) Appl. No.: 12/031,258

(22) Filed: Feb. 14, 2008

(65) Prior Publication Data

US 2009/0210368 A1    Aug. 20, 2009

(51) Int. Cl.
*G06F 15/18* (2006.01)
*G06E 1/00* (2006.01)
*G06E 3/00* (2006.01)
*G06G 7/00* (2006.01)

(52) U.S. Cl. ....................................................... 706/20
(58) Field of Classification Search .................... 706/20
See application file for complete search history.

(56) References Cited

U.S. PATENT DOCUMENTS

| | | | | |
|---|---|---|---|---|
| 6,816,786 | B2 * | 11/2004 | Intriligator et al. | 702/3 |
| 6,850,252 | B1 * | 2/2005 | Hoffberg | 715/716 |
| 7,006,881 | B1 * | 2/2006 | Hoffberg et al. | 700/83 |
| 7,096,121 | B2 * | 8/2006 | Intriligator et al. | 702/3 |
| 7,103,480 | B2 * | 9/2006 | Intriligator et al. | 702/3 |
| 7,136,710 | B1 * | 11/2006 | Hoffberg et al. | 700/83 |
| 7,187,790 | B2 * | 3/2007 | Sabol et al. | 382/128 |
| 7,451,005 | B2 * | 11/2008 | Hoffberg et al. | 700/83 |
| 7,457,785 | B1 * | 11/2008 | Greitzer et al. | 706/12 |
| 7,490,085 | B2 * | 2/2009 | Walker et al. | 1/1 |
| 7,574,276 | B2 * | 8/2009 | Weare et al. | 700/94 |
| 7,813,822 | B1 * | 10/2010 | Hoffberg | 700/94 |

OTHER PUBLICATIONS

Learning to Rank Using Semantic Features in Document Retrieval, Tian Weixin; Zhu Fuxi; Intelligent Systems, 2009. GCIS '09. WRI Global Congress on Volume: 3 Digital Object Identifier: 10.1109/GCIS.2009.148 Publication Year: 2009 , pp. 500-504.*

* cited by examiner

*Primary Examiner* — Michael Holmes
(74) *Attorney, Agent, or Firm* — Schwegman, Lundberg & Woessner, P.A.

(57) ABSTRACT

A method for near real time patterns identification, in one example embodiment, comprises receiving a data stream containing information associated with a transaction and participants of the transaction and receiving an Artificial Intelligence (AI) algorithm trained to score data in the data stream. The method may further comprise receiving metadata associated with the historical information, comparing the data stream to the metadata by measuring differences between variables included in the historical metadata and the data stream. The method may further comprise modifying the data stream to suit the AI algorithm when the differences between variables are below predetermined threshold values and retraining the AI algorithm based on the data stream when the differences between the variables are greater than the predetermined threshold values. The method may further comprise feeding the data stream to the AI algorithm to classify the variables in the data stream.

22 Claims, 12 Drawing Sheets

SYSTEM AND METHOD FOR REAL TIME PATTERN IDENTIFICATION

FIELD

This application relates generally to data processing, and more specifically to a system and method for real time pattern identification using an adaptive data platform.

BACKGROUND

Artificial Intelligence (AI) algorithms require a period of training prior to implementation because training data needs to be classified before the training can occur. However, waiting for the training data to be classified may be prohibitive due to changing behaviour patterns. Thus, an AI algorithm training utilizing a common development and deployment platform, where the training is based on new data with nearly instantaneous scoring, is difficult to implement.

BRIEF DESCRIPTION OF DRAWINGS

Example embodiments are illustrated by way of example and not limitation in the figures of the accompanying drawings, in which like references indicate similar elements and in which.

DETAILED DESCRIPTION

Figure 1:
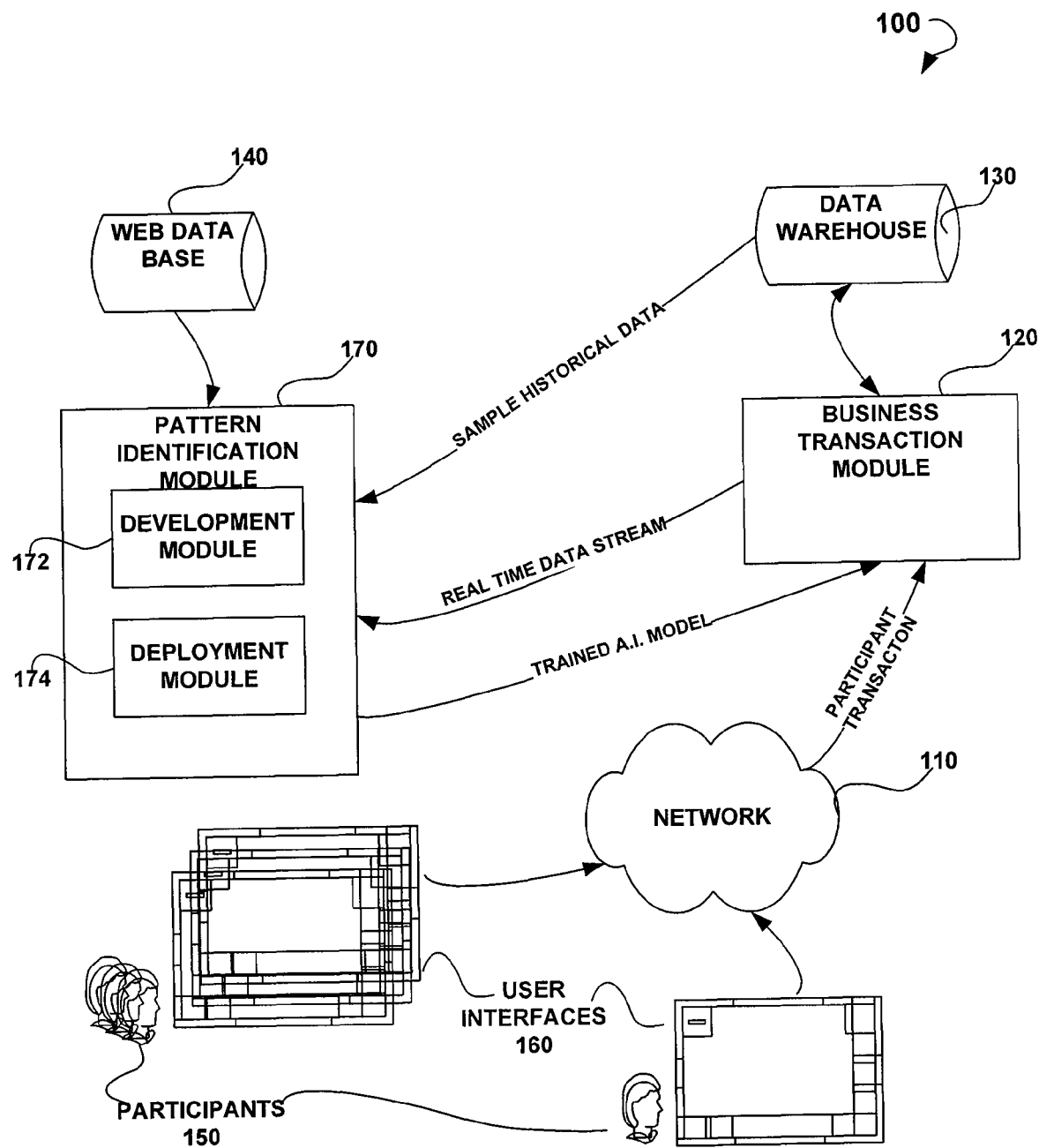
FIG. 1 is a block diagram showing architecture within which a system and method for real time pattern identification using an adaptive data platform are implemented, in accordance with an example embodiment.

When newly emerging patterns occur alongside previously identified patterns, a pattern recognition system may need to adapt rapidly. Historical data may help in the training of an Artificial intelligence (AI) based system. However, to respond to new, real time patterns, a system may need to adapt when new patterns arise. The system for real time pattern identification using an adaptive data platform may help to reduce turn around time for training AI algorithms by providing a canonical data format. New data may be adapted to fit the previously learnt AI algorithm during a certain window of time while the AI algorithm is retrained based on pattern changing behaviour.

The system for real time pattern identification using an adaptive data platform may automatically detect an optimal window of time to optimize accuracy while minimizing undue delay in response to a few emerging patterns. The system and method for real time pattern identification using an adaptive data platform may use a canonical data format that is common across the training and real time scoring mode. The canonical format may be configured to fit the AI algorithm used for training. An AI algorithm such as Neural Network may be trained based on a historical dataset that is converted to the canonical format. The trained AI algorithm may be deployed along with a training data insight. The training data insight is metadata describing the historical data used during training. Such insight could be based on statistical parameters such as mean and standard of the various variables. Other variables and criteria may be used.

In some example embodiments, the AI algorithm may classify real time patterns while the data stream is monitored. This approach may be implemented by determining whether the data stream shows a deviation from the training data insight (e.g., metadata describing historical data), based on predetermined thresholds. If the predetermined thresholds are trespassed, the data may be adapted, as explained later, to fit the trained AI algorithm.

In one example embodiment, numerical data may be renormalized based on the training data insight. Statistical parameters such as mean and standard deviation may be calculated based on real time data. When the statistical parameters differ from the statistical parameters seen during the training of the AI algorithm by a predetermined value, newer parameters may be used to normalize the data. Thus, the data may be adapted to suit the AI algorithm.

In some example embodiments, categorical data could be initialized based on the training data insight. Then affinity of the training data to categorical values may be used to determine defaults in case of unseen or missing values. Thus, a sufficient sliding window of time that needs to pass before the AI algorithm is trained may be determined. This may be achieved based on the 'training data insight' and predetermined thresholds for the windows of time.

In one example embodiment, the deviations from the training data insight are monitored to complete a fall cycle of positive and negative deviations. After passage of the time threshold, and completion of a predetermined number of cycles, the gathered real time data is added and the sliding window of time mechanism is used to retrain the AI algorithm based on an updated data set. Such adaptation of data, and automatic full retraining based on automatic selection of the sliding window of time may be possible because of the common development and deployment platform and the canonical data format used for both training and scoring.

In some example embodiments, AI algorithms may require a period of training prior to implementation. The training may typically utilize a representative data set mimicking the environment within which the AI algorithm is going to be deployed. The data used for training may be classified according to some qualities in interest. Once the training is completed, the AI algorithm may be utilized to score data. Certain situations, however, may require a real or near real time implementation of the trained AI algorithm based on changing patterns of data. Because the training occurs on newly received data, the training data may not be classified to a high confidence level. However, waiting for the training data to be classified to a high confidence level may be prohibitive due to the danger of the scoring qualities of the AI algorithm becoming obsolete.

Training AI algorithms, therefore, may be a continuous process where a user's behavior may adapt in response to the newly deployed business rules. Thus, it may be advantageous to have a common development and deployment platform shortening the time sufficient to train and deploy AI algorithms. This may allow the operators of the business transaction site to stay ahead of the changing behavioral patterns to prevent the patterns deemed undesirable. An adapting framework may be easily tailored per geographic region or per policy.

In some example embodiments, two modes may be utilized: a training mode and a scoring mode. The training mode may learn from the past and build models trying to predict behavior patterns based on the action taken by the participants. The scoring mode may apply the model to the real life transaction data trying to predict qualities in interest. The technology may allow frequent "retraining" of AI algorithms and rapid deployment using a single platform for training and scoring.

The AI algorithms used may include any number of deterministic algorithms. Additionally, these AI algorithms may utilize Case-Based Reasoning, Bayesian networks (including Hidden Markov Models), Neural Networks, or Fuzzy Systems. The Bayesian networks may include: Machine Learning Algorithms including Supervised Learning, Unsupervised Learning, Semi-Supervised Learning, Reinforcement Learning, Transduction, Learning to Learn Algorithms, or some other suitable Bayesian network. The neural networks may include: Kohonen Self-Organizing Network, Recurrent Networks, Simple Recurrent Networks, Hopfield Networks, Stochastic Neural Networks, Boltzmann Machines, Modular Neural Networks, Committee of Machines, Associative Neural Network, Holographic Associative Memory, Instantaneously Trained Networks, Spiking Neural Networks, Dynamic Neural Networks, Cascading Neural Networks, Neuro-Fuzzy Networks, or some other suitable Neural Network.

In some example embodiments, some type of advanced statistical methods may be utilized. These methods may include the use of Statistical Clusters, K-Means, Random Forests, Markov Processes, or some other suitable statistical method or algorithm. One or more of these advanced statistical methods may be used to create the AI based model.

In one example embodiment, a single common development and deployment platform is implemented wherein an AI algorithm is used to process a data stream in real time. The result of this processing is that certain patterns are recognized without the need for a-priori training of the AI algorithm. As applied within the context of rating of transactions involving human participants, such an AI algorithm would be able to prevent certain undesirable transactions at the first instance of being encountered, as opposed to after the undesirable transaction has occurred. Thus, when a change in a pattern emanating from a real time data stream is detected by the AI algorithm, a decision could be made as to whether the change represents a desirable or undesirable transaction.

The technology described herein may be utilized anywhere a user behaviour may need to be analyzed to determine possible deviations and the deviations classified in terms of importance. The technology may be applicable in any field concerned with the prediction of behavior based on historical data when behavioural patterns change rapidly, and the data may need to be analyzed quickly. In some embodiments, it may be determined that neural network AI algorithms are a better fit for the task at hand. In some example embodiments, different AI algorithms may be interchangeable within the development framework. As already mentioned above, in some example embodiments, the neural network may be more suitable in following rapidly changing patterns.

In some example embodiments, the development to deployment time may be reduced significantly because speed of the deployment may be more valuable than accuracy of classifications of behavioural patterns. Instead of waiting to determine, based on the actual results of transactions, whether a transaction was undesirable and then train the AI algorithm, it may be important to make a prediction and start training the AI algorithm as soon as possible. The technology may include a machine learning application that is used in a business setting where the goal is to constantly adapt business rules by identifying changing patterns. Therefore, the speed with which an AI algorithm used to train the data may be deployed may become more important than the accuracy of the predictions made. In some example embodiments, the technology may be utilized for a nearly instantaneous development to deployment cycle. A common platform utilized for the development and deployment may be tuned for faster development and deployment in a business setting.

FIG. 1 is a block diagram showing architecture within which a system and method for real time pattern identification using an adaptive data platform are implemented, in accordance with an example embodiment. As shown in FIG. 1, a sample network environment 100 may comprise a network 110, a business transaction module 120, a data warehouse 130, a web database 140, participants 150, user interfaces 160, and a pattern identification module 170.

The network 110 may be a network of data processing nodes which is interconnected for the purpose of data communication. In some example embodiments, the business transaction module 120 may be a server processing e-commerce transactions. The e-commerce transactions may comprise buying and selling of products or services over electronic systems such as the Internet and other computer networks. A wide variety of commerce may be conducted electronically. The transactions may include transfer of funds, supply chain management, Internet marketing, online transaction processing, electronic data interchange, automated inventory management, and automated data collection. The electronic commerce may use the World Wide Web (WWW) at least at some point in the transaction's lifecycle, although it may comprise a wider range of technologies. The transactions may include electronic commerce conducted for "virtual" items such as access to premium content on a website or in a computer-based simulated environment intended for its users to inhabit and interact via avatars.

The data warehouse 130, in some example embodiments, may be a facility utilized for housing electronic equipment, typically computers and communications equipment. The computers and the communication equipment may be used for the purpose of handling the data of the data warehouse 130. One of the purposes of the data warehouse 130 may be to run the applications that may handle business and operational data. The data warehouse 130 may be proprietary and developed internally, or bought from enterprise software vendors. Components of the data warehouse 130 may include databases, file servers, application servers, and middleware. The data warehouse 130 may also be used for an offsite backup database.

The web database 140 may be similar to the data warehouse 130 described above except that the data stored in the web database 140 may originate at website transactions. In some example embodiments, the data in the web database 140 may originate in transactions external to the business transaction module 120. The participants 150 may be parties to the transactions and include buyers, sellers, auction bidders, auction watchers, or any other parties to online transactions.

User interfaces 160, in some example embodiments, are graphical user interfaces (GUIs), which allow participants of business transactions to interact with a computer and computer-controlled devices. In some example embodiments, instead of offering only text menus or requiring typed commands, graphical icons, visual indicators, or special graphical elements may be presented. The icons may be used in conjunction with text, labels, or text navigation to fully represent the information and actions available to a user. The actions may be performed through direct manipulation of the graphical elements. The user interfaces 160 may be used to interact with the business transaction module 120 implementing rules based on trained AI models received from the pattern identification module 170. A pattern identification module 170 is described by way of example with reference to FIG. 2.

Figure 2:
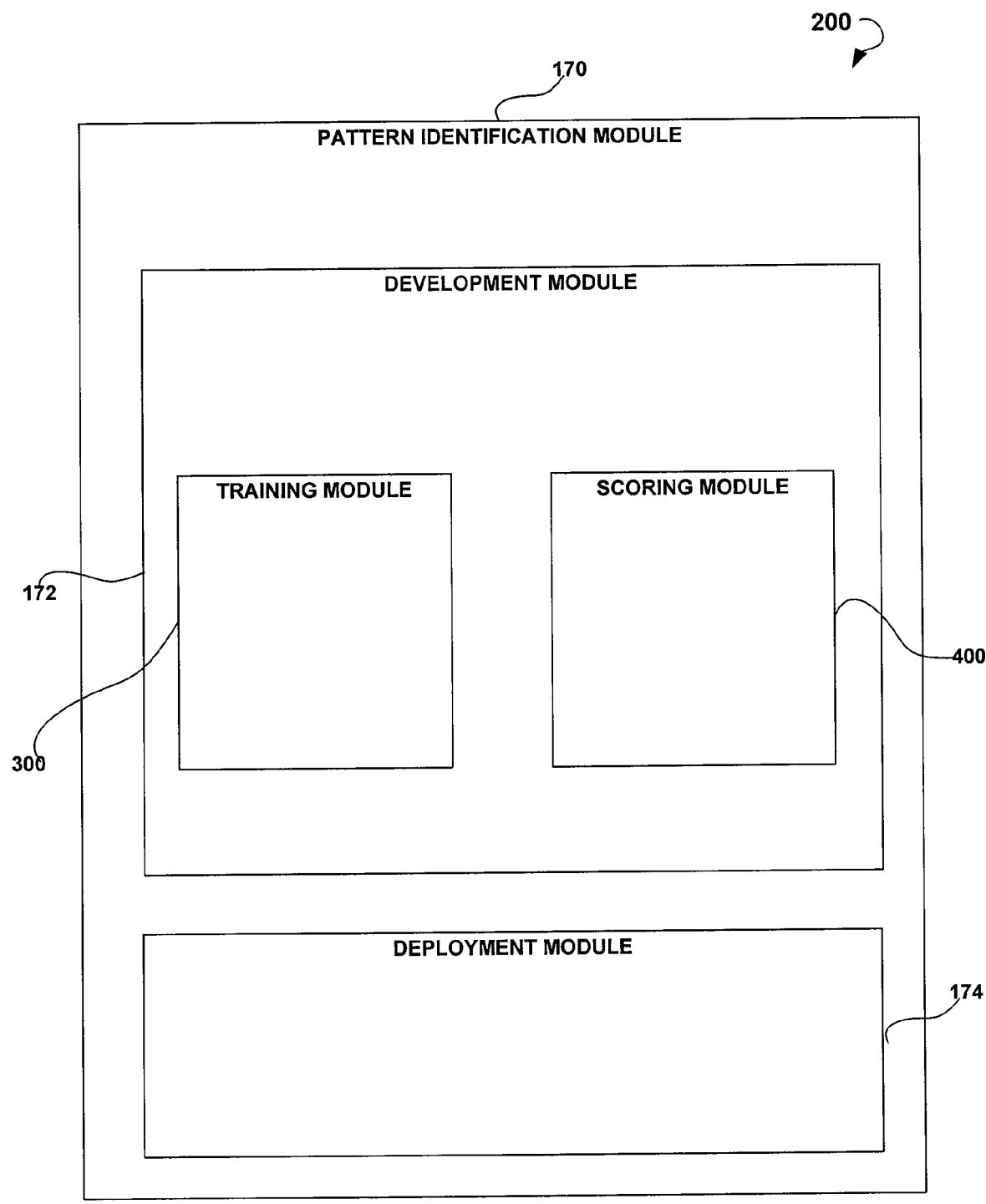
FIG. 2 is a block diagram showing a pattern identification module, in accordance with an example embodiment.

FIG. 2 is a block diagram showing a pattern identification module, in accordance with an example embodiment. In FIG. 2 of the drawings, reference number 200 refers to a pattern identification module 170 as shown to include several components that may be configured to perform various operations. The pattern identification module 170 may comprise development module 172 and the deployment module 174. The development module 172 may further comprise a training module 300 and a scoring module 400. The development module 172 may be the module where the training module 300 is to train an AI algorithm. In some example embodiments, the deployment module 174 may also be included in the pattern identification module 170. In some example embodiments, the training module 300 may be utilized to train a pluggable AI algorithm that is determined to be suitable for specific pattern recognition.

Pattern recognition may be a type of machine learning defined as an act of taking in data and taking an action based on the category of the data. Pattern recognition may classify data patterns based on either a-priori knowledge or on statistical information extracted from the patterns. The patterns to be classified are typically groups of measurements or observations defining points in an appropriate multidimensional space.

In some example embodiments, a pattern recognition system may consist of a sensor that gathers the observations to be classified or described, a feature extraction mechanism that computes numeric or symbolic information from the observations, and a classification or description scheme that classifies or describes observations by relying on the extracted features. Thus, historical transaction data stored in the data warehouse 130 may be used as a set of reference data. The classification or description scheme is typically based on the availability of a set of patterns that have already been classified or described. This set of patterns may be referred to as the training set and the resulting learning strategy is characterized as supervised learning.

Once the AI algorithm is trained, scoring module 400 may be utilized to score the data of interest and the deployment module 174 may be utilized to deploy the data to the business transaction module 120. The business transaction module 120 may, consequently, determine how to process the transactions based on the discrepancies with historical data and the classifications assigned. The training module 300 is described by way of example with reference to an example module 300 of FIG. 3.

Figure 3:
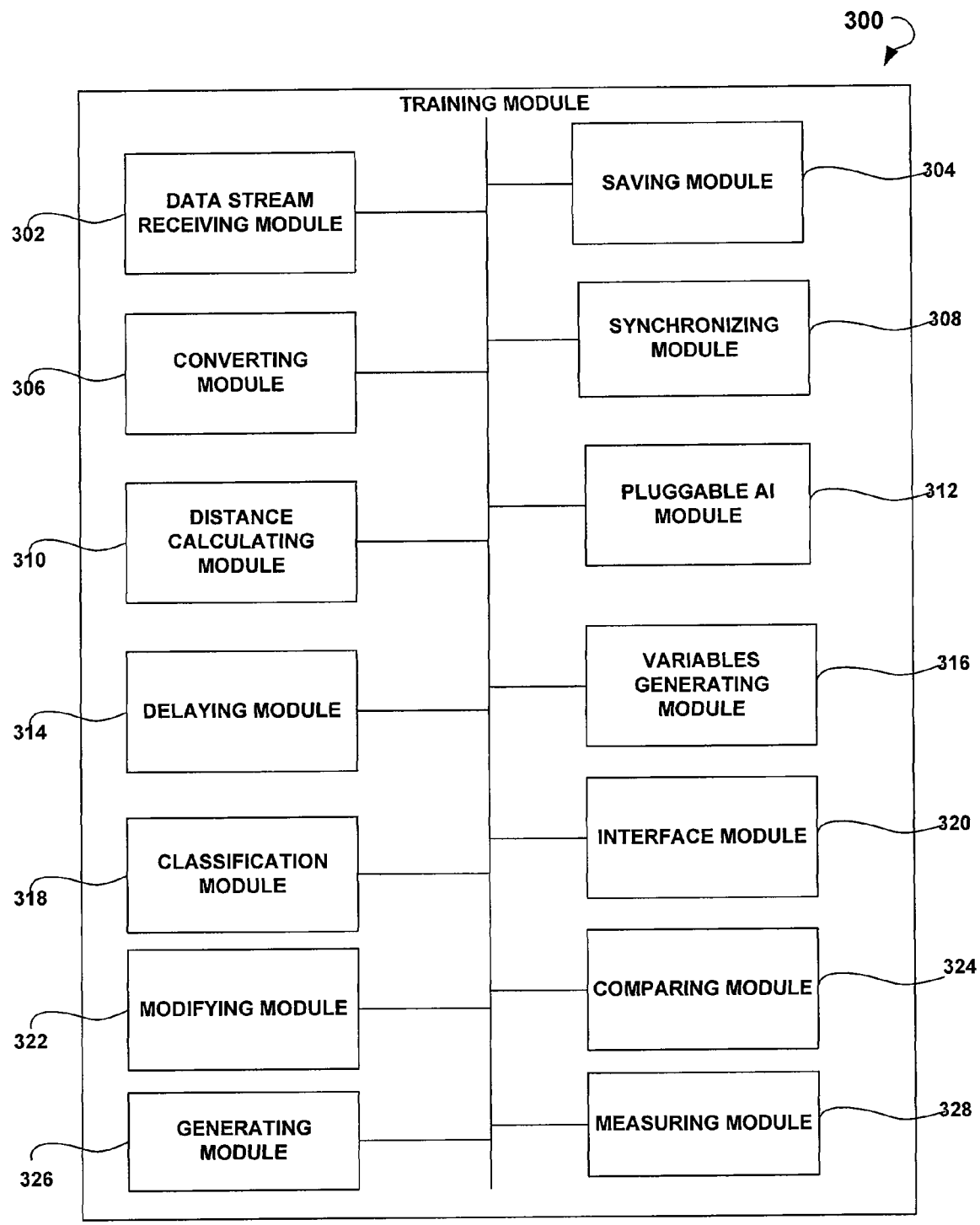
FIG. 3 is a block diagram showing a training module, in accordance with an example embodiment.

FIG. 3 is a block diagram showing a training module, in accordance with an example embodiment. Referring to FIG. 3 of the drawings, the training module 300 is shown to include several components that may be configured to perform various operations. The training module 300 may comprise a data stream receiving module 302, a saving module 304, a converting module 306, a synchronizing module 308, a distance calculating module 310, a pluggable AI module 312, a delaying module 314, a variables generating module 316, a classification module 318, and an interface module 320. Typically, in training AI algorithms, training examples may be determined first. Thus, it may be determined first what kind of data is to be used as an example or a training set. Next, a training set may be gathered. The training set may need to be typical of the real-world use of the function. Accordingly, the data stream receiving module 302 may be utilized to gather data.

Thereafter, the input feature representation of the learned function may be determined. The accuracy of the learned function may depend on how the input object is represented. Typically, the input object is transformed into a feature vector, which contains a number of features that are descriptive of the object. Next, the structure of the learned function and corresponding learning AI algorithm may be determined. In some example embodiments, artificial neural networks may be used. Thereafter, the learning AI algorithm may be run on the gathered set received by the data stream receiving module 302. In some example embodiments, parameters of the learning AI algorithm may be adjusted by optimizing performance on a validation subset of the training set. After parameter adjustment and learning, the performance of the AI algorithm may be measured on a test set that is separate from the training set.

In some example embodiments, because training of the AI algorithm may require already classified data, data gathered from new transactions may be saved by the saving module 304 to be used in training AI algorithms once the quality of the transaction becomes known to a certain degree of confidence. The data received from various data sources may be in various formats. Accordingly, the converting module 306 may convert the data from various formats in single canonical form. Once the data from various sources is transformed into canonical form, the synchronizing module 308 may synchronize homogeneous pieces of data from the historical database to the new transaction data being analyzed. In some example embodiments, the synchronization may reveal the discrepancies between homogeneous data. The distance calculating module 310 may calculate the distances between the synchronized pieces of data, and assign variables to the data. The distances calculated may be expressed in metric values.

The pluggable AI module 312 may be utilized to receive an AI algorithm. In some example embodiments, it may be determined that neural networks are more suitable, and, accordingly, neural networks may be plugged into the training module 300 to be used as the AI algorithm of the choice. In some example embodiments, the delaying module 314 is the module that may determine the time for which the newly received data is saved in order to determine the quality of the transaction. As an example, the delaying module 314 may determine that in order to classify the training data set to an 80% confidence level, the delay may need to exceed a certain predetermined time. Accordingly, the delaying module 314 may delay the deployment of the transaction data to the training set for a certain time to receive actual feedback on the transactions.

The variables generating module 316, in some example embodiments, may generate variables from the distances between homogeneous synchronized data. Based on the classification of the historical data by the classification module 318 below, the values may be assigned to each variable. The classification module 318, in some example embodiments, may classify variables based on the importance associated with the variables as determined from analysis of the historical data. How the importance is determined is described in more detail with reference to FIG. 11 below. The interface module 320, in some example embodiments, is a GUI allowing operators to manually classify transactions based on the user feedback.

Figure 4:
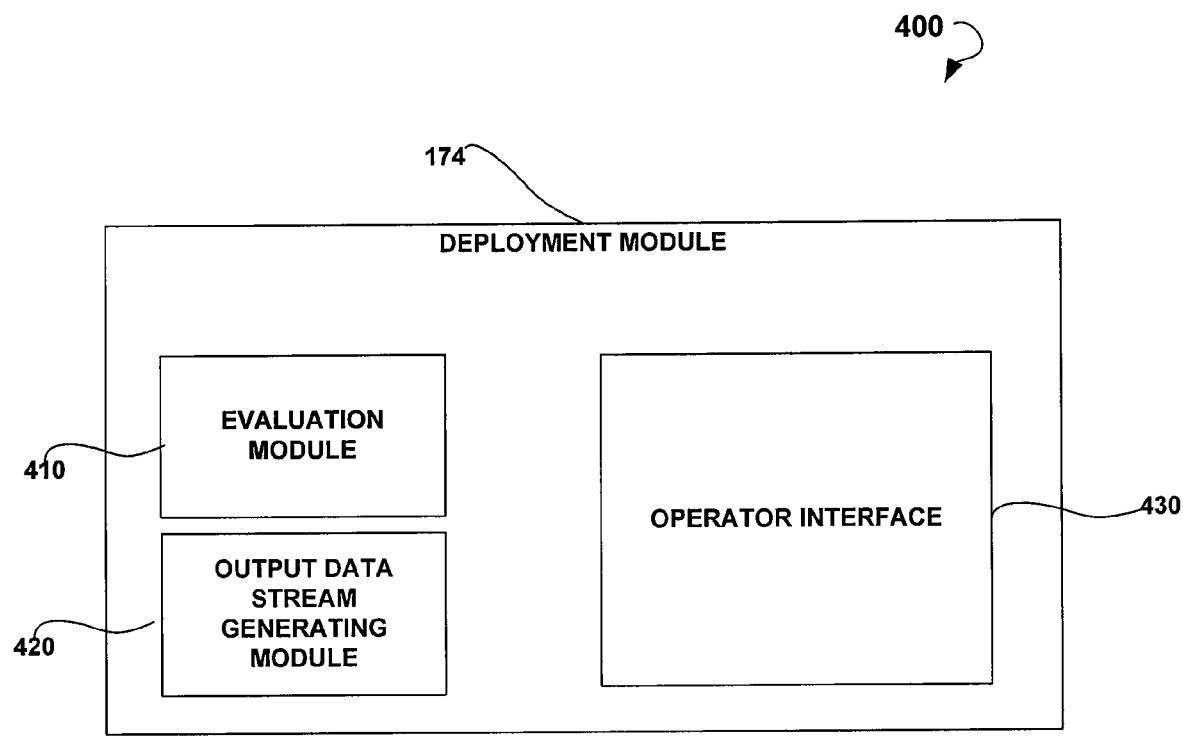
FIG. 4 is a block diagram showing a deployment module, in accordance with an example embodiment.

FIG. 4 is a block diagram showing a deployment module, in accordance with an example embodiment. In FIG. 4 of the drawings, reference number 400 refers to the deployment module 174 as shown to include several components that may be configured to perform various operations. It may comprise an evaluation module 410, an output data stream generating module 420, and an operator interface 430. The deployment module 174, in some example embodiments, may share a common platform with development module 172 to provide a rapid deployment of the variables classified by the trained AI algorithms to the business transaction module 120. The evaluation module 410 may utilize the trained AI algorithm to classify the variables generated by the variable generating module 316 according to the data associated with corresponding transactions. The operator interface 430 may be utilized to receive manual input operators when adjustments for the classifications of the variables are needed. The output data stream generating module 420 may be utilized to send the stream of generated variables to the business transaction module 120.

Figure 5:
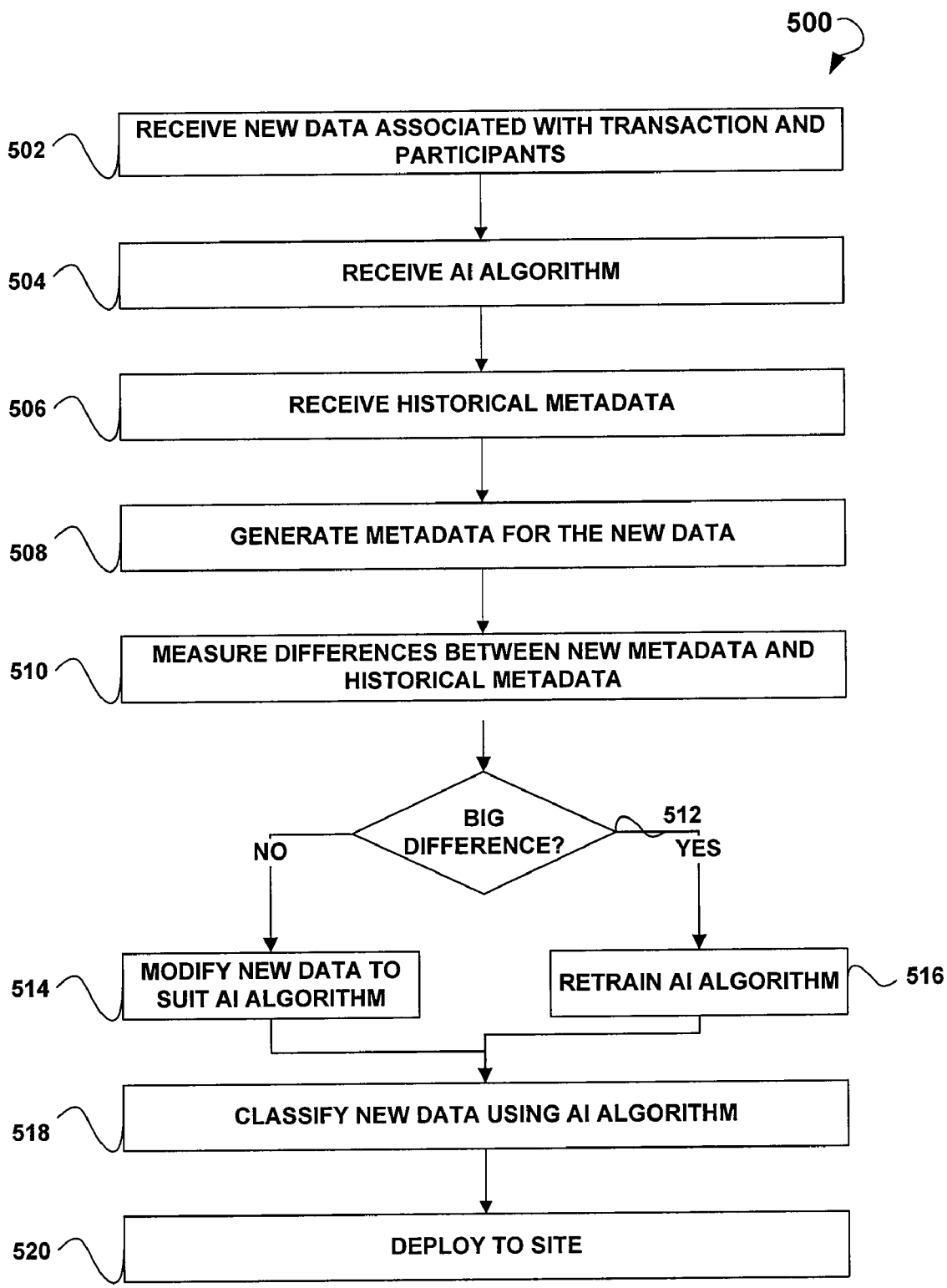
FIG. 5 is a flow chart showing a method for real time pattern identification, in accordance with an example embodiment.

FIG. 5 is a flow chart showing a method 500 for real time pattern identification, in accordance with an example embodiment. In some example embodiments, the data may need to be changed to suit the AI algorithm. Tests may be performed to determine whether the AI algorithm is suitable for the variables in the data stream. The tests may show whether the AI algorithm may need to be retained. Thus, the determination whether to retrain the AI algorithm is based on the actual transaction data.

When the AI algorithm is trained, the metadata describing the historical data from the training set is recorded. The metadata describes characteristics of the variables found in the training set and saved with the AI algorithm trained to learn the patterns. Thereafter, the AI algorithm may be utilized to classify new data as long as the new data is not too different from the historical data. However, if the new data is drastically different from the historical data, modifying the new data is not sufficient. Accordingly, the AI algorithm may need to be retrained.

The corresponding variables in the metadata and the new data may be analyzed and the difference between the variables compared to predetermined thresholds. When the difference is below the thresholds, the new data may be modified and classified by the AI algorithm. When, on the other hand, the difference is above the threshold, the AI algorithm may need to be retrained based on the new data.

Thus method 500 may commence at operation 502 with receiving new data associated with the transaction and the participant by the data stream receiving module 302. At operation 504, the data stream receiving module 302 may receive the AI algorithm trained on a set of historical data as well as metadata associated with the historical data at operation 506. The metadata may include statistical variables describing the historical data along with their averages and standard deviation.

At operation 508, the generating module 326 may generate metadata for the new data and at operation 510 the measuring module 328 may measure differences between the new data and the metadata related to the historical data. If at operation 512, the comparing module 324 determines that the differences between the variables in the metadata and the new data are larger than predetermined thresholds, the AI algorithm may not be suitable to classify the new data and may need to be retrained at operation 516.

If, on the other hand, the differences are less than the predetermined thresholds, the new data may be modified to suit the AI algorithm at operation 514 by the modifying module 322. The method 500 may proceed to classify the new data using AI algorithm at operation 518 using the classification module and to deploy the classified data at operation 520 using output data stream generating module 420.

Figure 6:
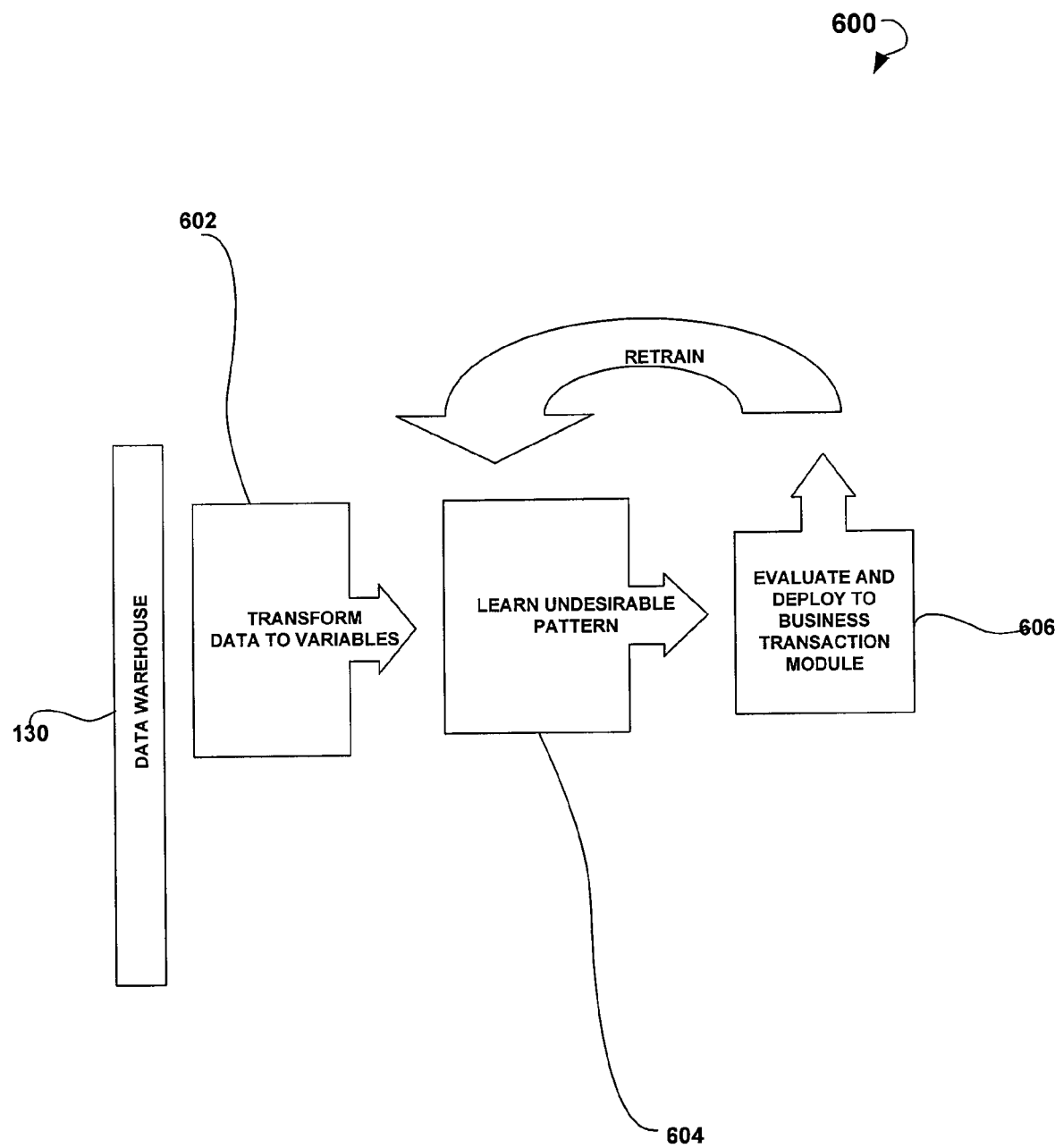
FIG. 6 is a flow chart showing a high level method for real time pattern identification using an adaptive data platform, in accordance with an example embodiment.

FIG. 6 is a flow chart showing a high level method 600 for real time pattern identification using an adaptive data platform, in accordance with an example embodiment. The method 600 commences with data being received at operation 602 from the data warehouse 130. At operation 604, undesirable behavioural patterns are learned and at operation 606 transaction data is evaluated and deployed to the business transaction module 120. An example method for real time pattern identification using an adaptive data platform is shown in more detail with reference to FIG. 8 below. The method 600 may be performed by the various modules discussed above with reference to FIG. 4. These modules may comprise processing logic.

Figure 7:
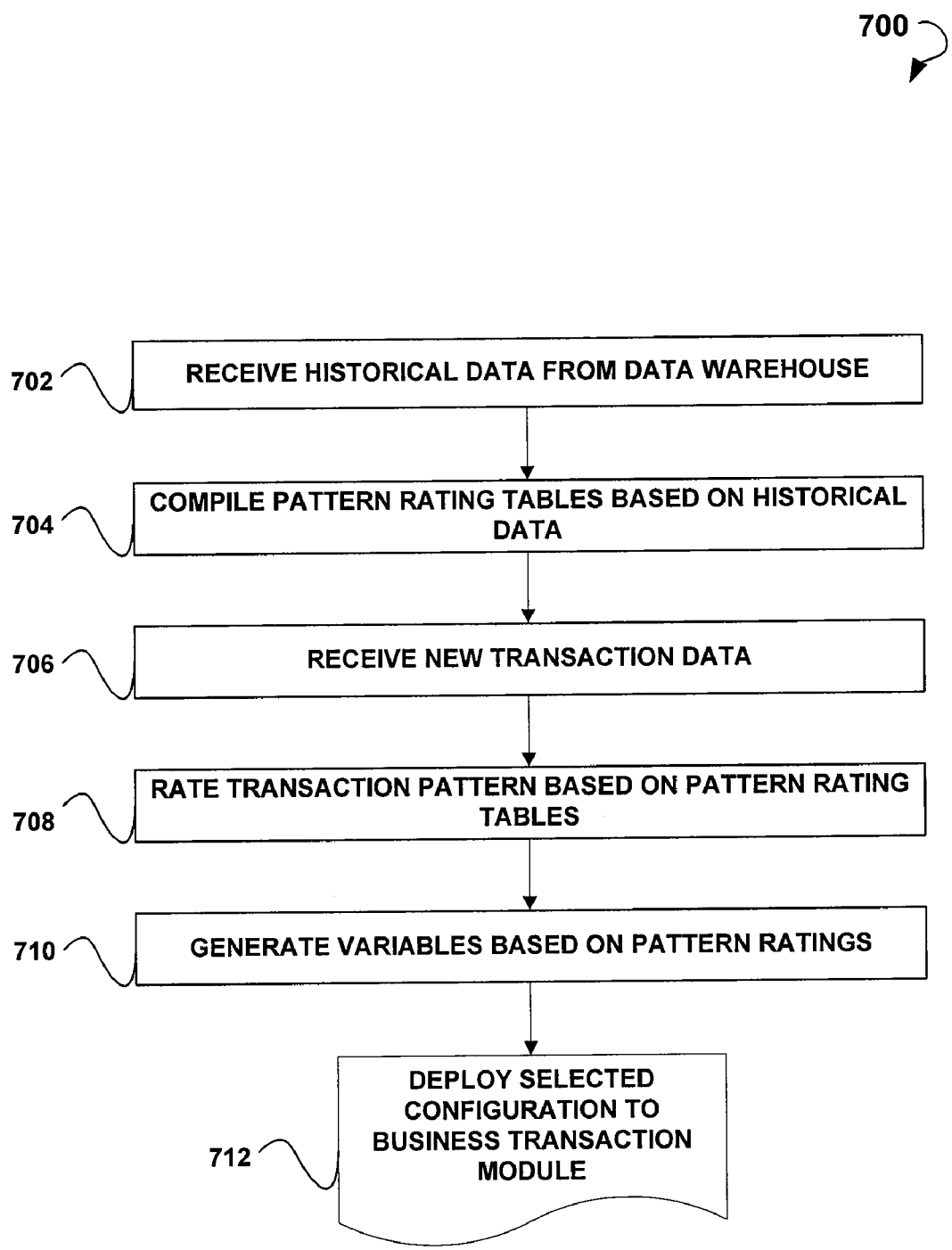
FIG. 7 is a flow chart showing a method for rating of transactions, in accordance with an example embodiment.

FIG. 7 is a flow chart showing a method 700 for rating of transactions, in accordance with an example embodiment. As shown in FIG. 7, the method 700 commences with the data stream receiving module 302 receiving historical data from the data warehouse at operation 702. At operation 704, pattern rating tables based on historical data may be compiled based on the historical transaction data also received by the data stream receiving module 302. Because certain behavior patterns may result in a higher rate of feedback classified as undesirable, the patterns may be assigned a higher rating in the pattern rating tables. At operation 706, new transaction data may be received by the data stream receiving module 302, and, at operation 708, this data is rated based on pattern rating tables. Variables may be generated at operation 710 by the variables generating module 316 based on pattern ratings from the discrepancies between the new transaction data and the historical transaction data. At operation 712, a configuration based on the variables and assigned values are deployed to the business transaction module 120.

Figure 8:
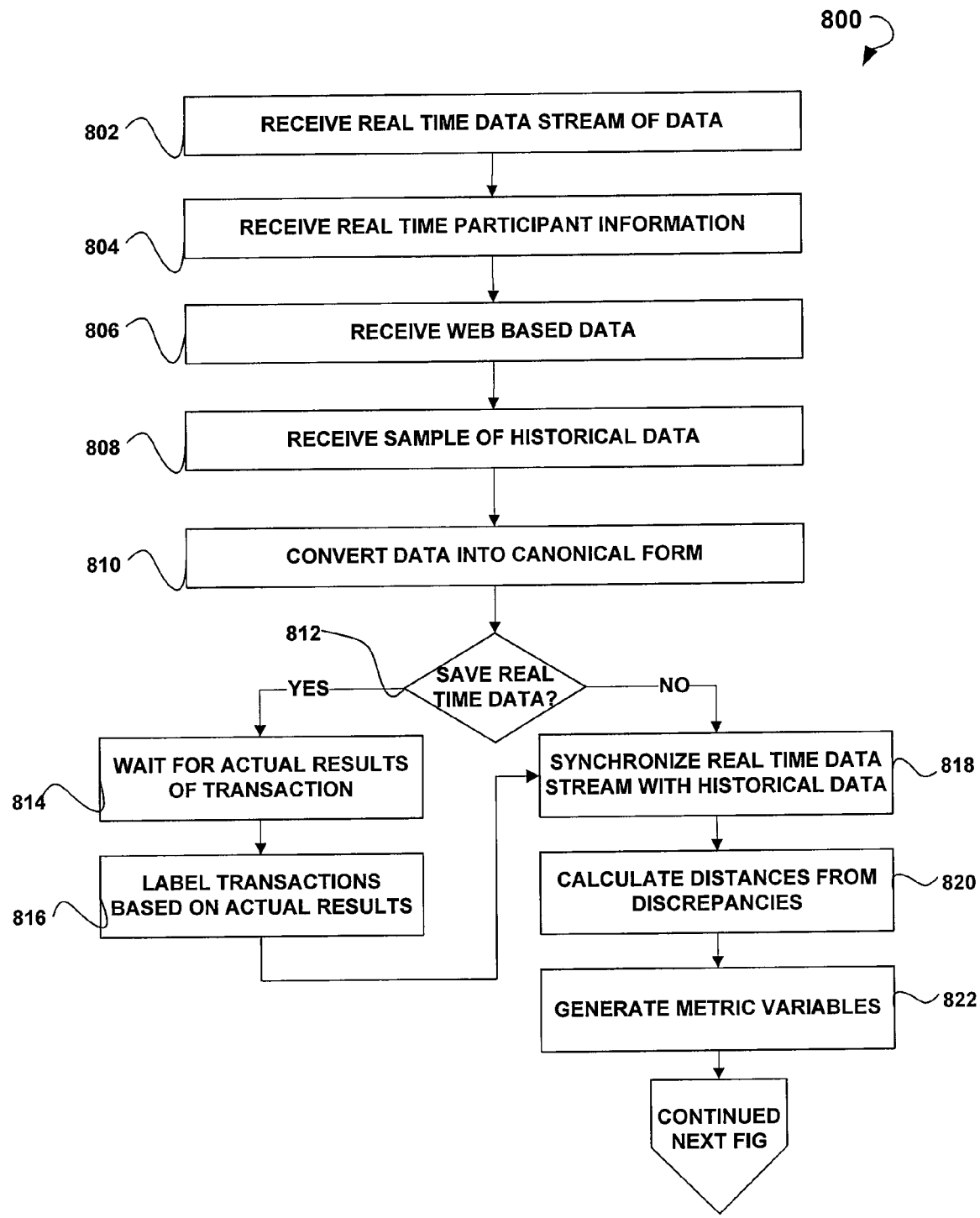
FIG. 8 is the first part of a flow chart showing a method for real time pattern identification using an adaptive data platform, in accordance with an example embodiment.

FIG. 8 is the first part of a flow chart showing a method 800 for real time pattern identification using an adaptive data platform, in accordance with an example embodiment. The example method 800 commences with receiving a real time data stream of data at operation 802 by the data stream receiving module 302. The data stream may comprise real time user transaction data. At operation 804, real time participant information may be received. The real time participant information, along with the real time transaction data, may be used to compare the data to the web based data received at operation 806 and the historical data at operation 808. Because the data received from the data warehouse 130 and the business transaction module 120 may be in different formats, the data may be difficult to compare. Accordingly, the data in different formats may be converted into a canonical form at operation 810 by the converting module 306 in order to find discrepancies.

In some example embodiments, external as well as internal data is automatically converted into the variables that a machine learning system may understand. In some example embodiments, there may be multiple sources of historical data, including an internally existing database and external sources from the WWW. The data gathered from various data sources may be synchronized at operation 818 by the synchronizing module 308.

At decision block 812, a decision may be made whether to save the real time data received at operation 802 and operation 804. The decision to save the data may be made in order to determine the actual results of the transactions. Thus, in some example embodiments, depending on how accurately an AI algorithm needs to be trained, there may be some delay before training based on this stream of data may occur. It may be determined that actual transaction results are needed for the received data to be labelled to a certain predetermined degree of confidence. As an example, it may take a several days after the transaction has occurred for the transaction feedback to be received by the system.

In some example embodiments, there may be two data streams, one received at operation 802 by the data stream receiving module 302 and the other passed on to the business transaction module 120 at operation 834 by the output data stream generating module 420 as described in more detail below. The delay between receiving the data and deployment of a trained AI algorithm may be instituted for a variable amount of time depending on what degree of confidence in the classification of transactions needs to be achieved. In some example embodiments, the data stream may be scored instantly. However, to achieve better results in classification, the data stream may be delayed by the delaying module 314 for a certain time while accurate labels can be determined. Once the accurate labels are determined, the labels may be used to retrain the AI algorithm.

In some example embodiments, a prediction may be made in order to classify a transaction. However, if after a delay there is a discrepancy between the analysis of historical data and the actual results, human interaction may be needed to adjust that data. Accordingly, an operator may use the interface module 320 to manually adjust the classification of the transaction. In some example embodiments, the scoring may be performed by the evaluation module 410 automatically at the instant (or nearly so) of the transaction occurring in real time between the participants of the transaction. However, when the data is scored by the evaluation module 410, it may be just a prediction based on the classification of the historical data and the discrepancies observed between the real time transaction data and the historical data.

In some example embodiments, at the time a prediction classifying a transaction is made, a statistical probability, but not actual results of a particular transaction, are known. Therefore, it is not known to 100% certainty whether that prediction is accurate until feedback for the transaction is received. Once the actual results are received, a retraining of the AI algorithm may occur. Thus, the system may make a prediction but the system may not be sufficiently confident until some passage of time as to whether the prediction was made correctly.

In some example embodiments, where the predictions need to be made rapidly due to changing behavior patterns, it may be more beneficial to sacrifice confidence in making correct predictions in exchange for a nearly instantaneous training and deployment of an AI algorithm by the classification module 318. Accordingly, there may be a trade off and it needs to be decided whether it is more beneficial to wait for the result of the transaction. In some example embodiments, it may be beneficial to wait some predetermined time to eliminate the majority of the incorrect predictions.

Thus, in some embodiments, the predictions are done instantaneously and the AI algorithm is trained based on these predictions. In some embodiments, there may be a lag between the time the predictions are made and the AI algorithms are trained. As an example, statistics may suggest that the quality of transactions may become apparent within 10 days of the time at which the transaction occurs. If 80% of the transactions may be qualified within 2 days, it may be beneficial not to wait any longer if the speed of the turnaround is important. In some example embodiments, the neural network may be used because it has enough resilience to handle mislabelling of the transactions.

In some embodiments, for example, there may be 100 transactions and 60 of them are eventually determined as having a quality considered undesirable. The undesirable quality of the transaction may be positively established in two days for 50 out of the 60 transactions that will eventually be found undesirable. Thus, if the algorithm is retrained after two days, only 10 events may be mislabelled. AI algorithms, (e.g., neural networks) may be able to determine mislabelling when there is a smaller number of such mislabelling. Thus, in some embodiments, after a certain threshold is passed, (e.g., 10 days) the AI algorithm may be retrained with a small risk of mislabelling the transactions. Accordingly, depending on the degree of confidence and speed that is needed to be achieved, different delays may be established.

In some example embodiments, the training module 300 is being used to score data in real time, and that same real time scoring stream received by the data stream receiving module 302 is then used to retrain the AI algorithm with a delay instituted by the delaying module 314 to ensure that the most possible transactions are correctly labelled. In some example embodiments, a platform may be utilized that uses data in canonical form, augmented with other aggregate information. The technology may not depend on a particular type of AI algorithm and multiple types of machine AI algorithms may be pluggable by the pluggable AI module 312.

After a certain predetermined degree of confidence is achieved, the predictions made by the classification module 318 may be passed to the business transaction module 120 by the output data stream generating module 420 in a data stream. In some example embodiments, a trained AI algorithm and a classification score may be output to the business transaction module 120. In some example embodiments, only a trained AI algorithm may be output to the business transaction module 120 with transactions being classified later at the business transaction module 120.

If it is determined that a delay needs to be instituted and the data saved until transactions may be classified based on the actual results, the data may be saved at operation 814 by the saving module 304 for a predetermined time. The predetermined time may be calculated base on the desired degree of accuracy in classification of the training set versus the need for a rapid deployment of the AI algorithm. At operation 816, the transactions may be labelled based on the actual results received by the classification module 318. In some example embodiments, regardless of whether it is determined that a delay needs to be instituted in order to receive actual results of the transaction, at operation 818 the historical data received at operation 808 may be synchronized with real time data received at operation 802 by the synchronizing module 308. The synchronization of the real time data with the historical data may allow for determining the discrepancies between the data and representing the discrepancies in terms of metric distances. Accordingly, at operation 820, metric distances may be calculated from the discrepancies between the data.

In some example embodiments, the metric distance based on the discrepancies may represent a Hamming distance, which measures the minimum number of substitutions required to change a data unit (e.g. last name) into another or the number of errors that transforms one string into another. Thereafter, the calculated distance is expressed as a metric value. With physical locations, the metric distance may be expressed in miles. Consequently, the system may determine whether the physical location is correctly stated by the user. There may be a generic metric value between any subset of data that is synchronized at operation 818.

As already mentioned above, the distance between two entities may be expressed in metric values and the entities may represent names, descriptions, or geographical locations. The data about the transactions and the users may be derived from the history of the transaction by a specific user. There may be various ways to determine whether the user has never been registered with the business transaction module 120. As an example, if the user creates a new account, data comparisons may allow a determination to be made whether the user has previously been registered under another name and what other users the user may have links to. The data comparisons may also allow a determination to be made whether there are links between the user and previous users that might have been suspended. Thus, the data gathered may include data about this particular user, information about other users that this user transacted with, and the history that may allow correlating this user to the user or users that were previously suspended.

As an example, a trivial case comparison between the historical data and real time data may be made when the data compared is derived from the transactions engaged in by the same user. When the data from the same user is under consideration, if there is an event that deviates from the user's typical behaviour, the metric value of the difference may be large. If such a deviating behavioural event occurs, the user may be placed in a group. Even if the user changes his or her identity, associations may be still made, although such associations may be harder to make.

In some embodiments, instantaneous predictions may be made based on the determined metric distances, and the data stream may be used as opposed to some sets of previously gathered data. The instantaneous predictions may allow the turnaround for deploying that is nearly instantaneous in that the training is essentially automatic with an occasional delay incurred to allow a manual review of the results.

Figure 9:
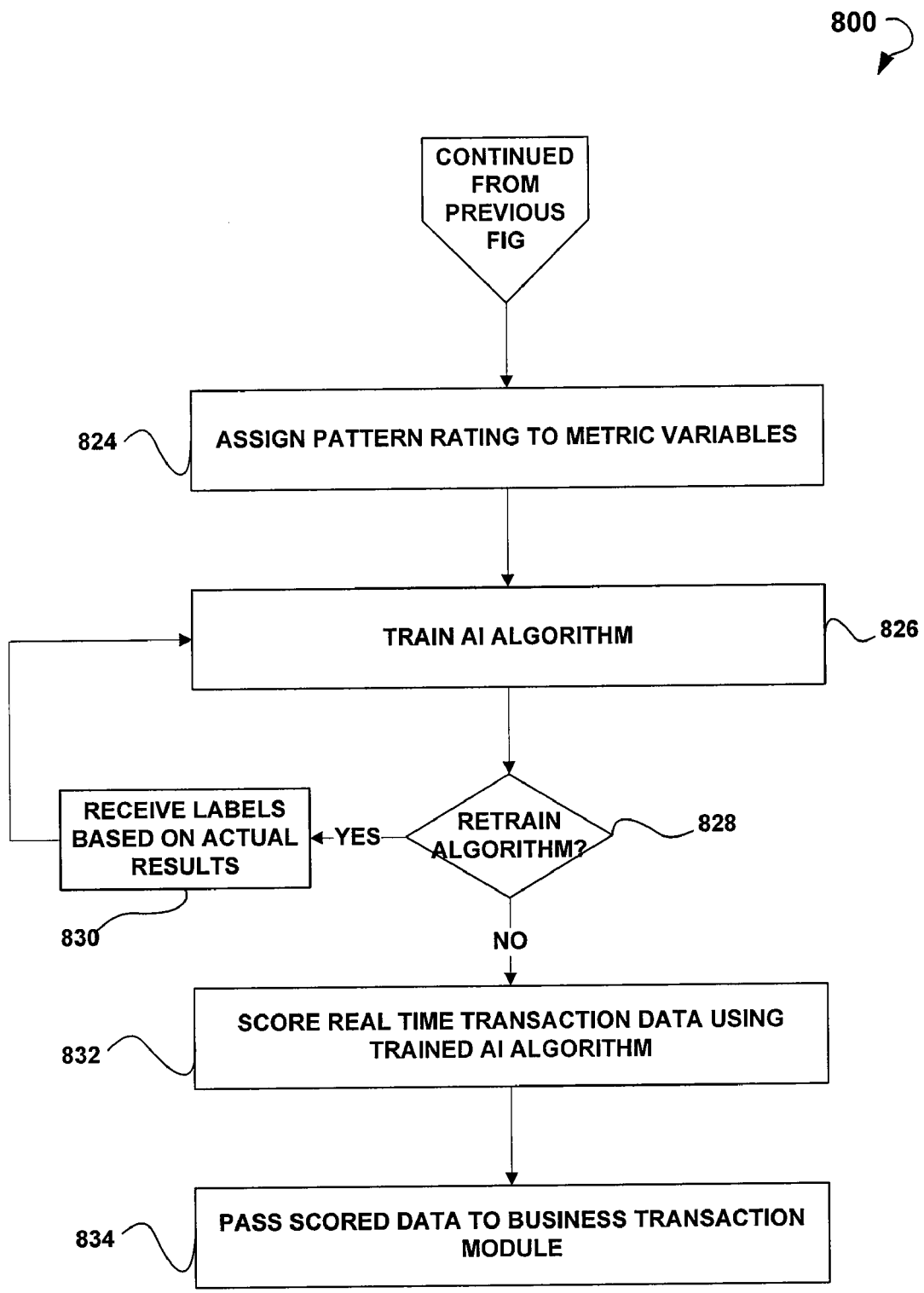
FIG. 9 is the second part of a flow chart showing a method for real time pattern identification using an adaptive data platform, in accordance with an example embodiment.

Referring to FIG. 9, method 800 continues from FIG. 8 and at operation 824, metric variables generated at operation 822 may be assigned rating based on the metric distances as described above. The rating assigned to the metric variables may be deployed to the business transaction module 120 along with a trained AI algorithm. The ratings may represent how important a particular type of the metric distance is, based on historical transactions. Some metrics may be more important than others because not all behavioural pattern deviations are equally important in business transactions.

At operation 826, in some example embodiments, an AI algorithm may be trained based on a training set derived from the historical data and the data from the continuous stream classified based on the metric distances and their importance. An AI algorithm may use classifiers to classify the data. Classifiers are functions that can be tuned according to examples, thus making them very attractive for use in AI. These examples are known as observations or patterns. In supervised learning, each pattern belongs to a certain predefined class. A class can be seen as a decision that has to be made. All the observations combined with their class labels are known as a data set.

When a new observation is received, that observation is classified based on previous experience. A classifier can be trained in various ways; these are mainly statistical and machine learning approaches. Classifier performance depends greatly on the characteristics of the data to be classified. Various empirical tests may be performed to compare classifier performance and to find the characteristics of data that determine classifier performance. Determining a suitable classifier for a given problem may depend on different variables.

At decision block 828, it is determined whether the AI algorithm may need to be retrained based on the actual transaction data available. If the actual transactional data is available, the AI algorithm may receive labels based on the actual results at operation 830. If, on the other hand, the AI algorithm need not be retrained, then the workflow may proceed to operation 832 and score real time transaction data using the trained AI algorithm. At operation 834, the workflow may pass scored data to business transaction module 120.

Figure 10:
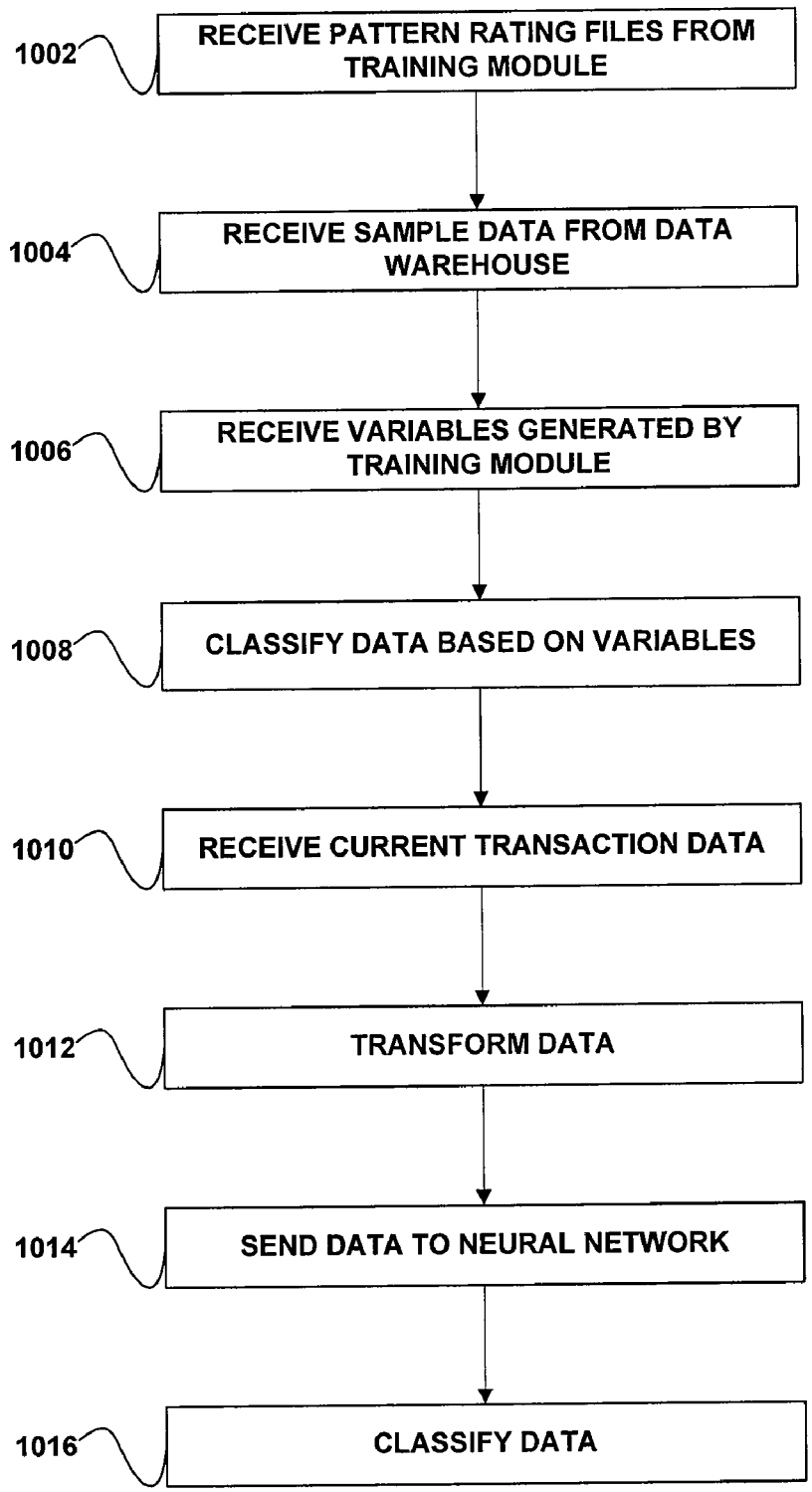
FIG. 10 is a flow chart showing a data scoring method, in accordance with an example embodiment.

FIG. 10 is a flow chart showing a data scoring method, in accordance with an example embodiment. In some example embodiments, method 1000 commences at operation 1002 with receiving pattern rating files from training module 300. The method 1000 then proceeds to receive sample data from a data warehouse at operation 1004. At operation 1006, variables generated by the training module 300 are received, and, at operation 1008, the data is classified based on the variables received. At operation 1010, the current transaction data may be received, and at operation 1012, data may be transformed and then sent to the neural network AI algorithm at operation 1014. At operation 1016, the data may be classified.

Figure 11:
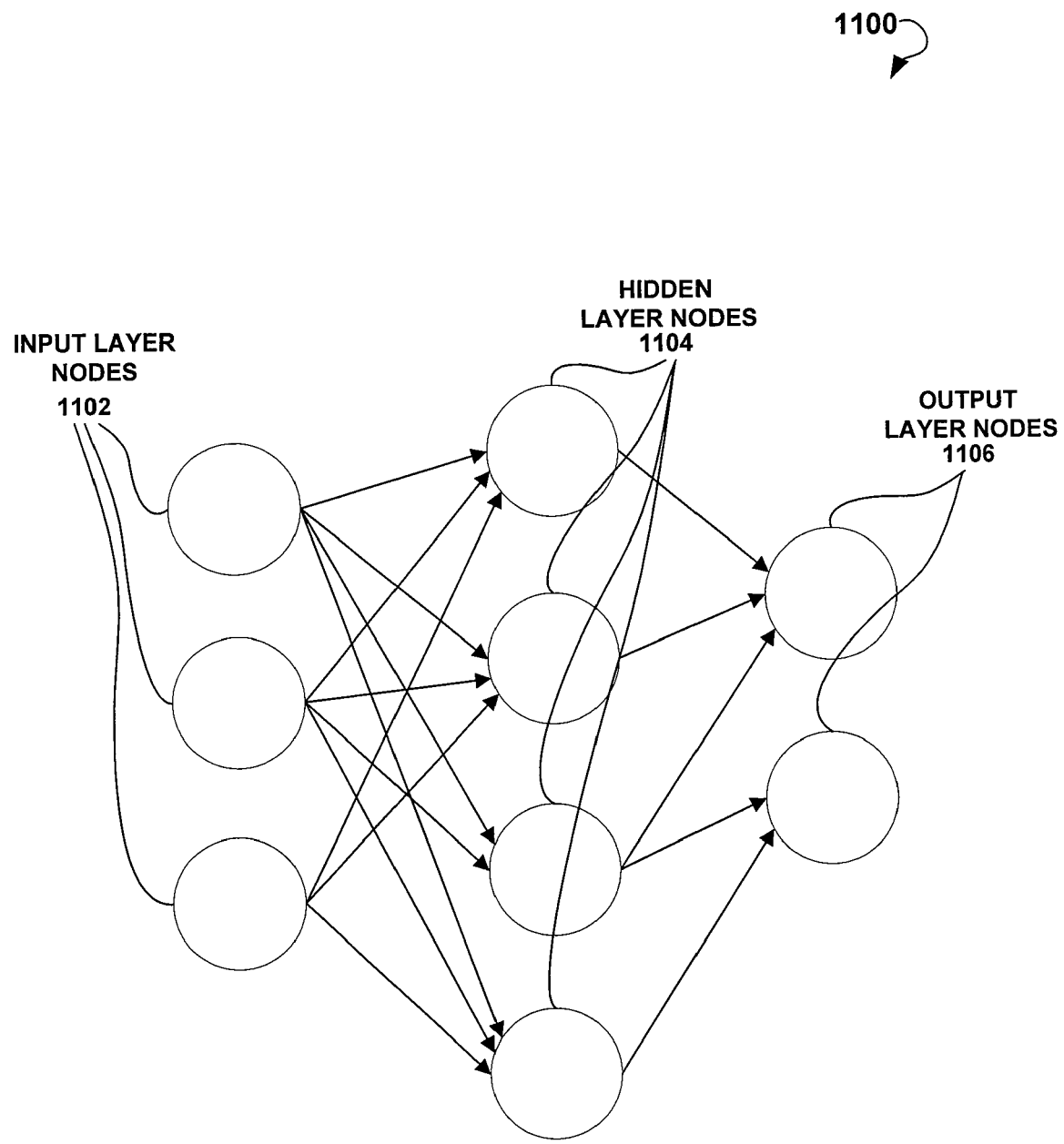
FIG. 11 is a block diagram showing a simplified neural network, in accordance with an example embodiment.

FIG. 11 is a block diagram showing a simplified neural network 1100, in accordance with an example embodiment. As shown in FIG. 1100, the neural network 1100 is a computational model based on biological neural networks. A neural network consists of an interconnected group of nodes and processes information using a connectionist approach to computation. The information may enter through the input layer nodes 1102, be processed in the hidden layer nodes 1104, and then output at the output layer nodes 1106. A neural network is an adaptive system that changes its structure based on external or internal information that flows through the network during the learning phase.

Figure 12:
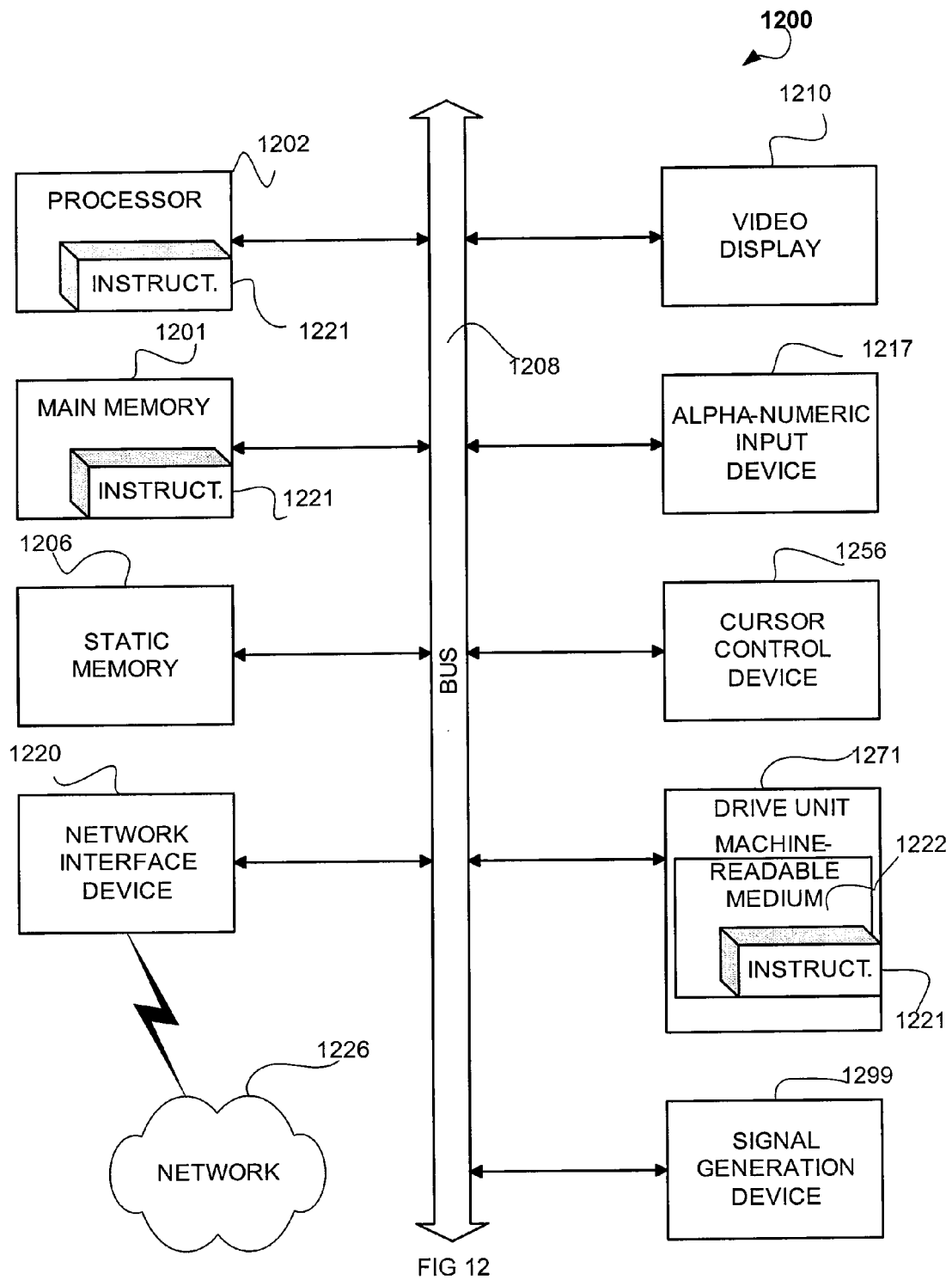
FIG. 12 is a diagrammatic representation of an example machine in the form of a computer system within which a set of instructions for causing the machine to perform any one or more of the methodologies discussed herein is executed.

FIG. 12 is a diagrammatic representation of an example machine in the form of a computer system 1200, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor or multiple processors 1202 (e.g., a central processing unit (CPU), a graphics processing unit (GPU), or both), and a main memory 1201 and static memory 1206, which communicate with each other via a bus 1208. The computer system 1200 may further include a video display unit 1210 (e.g., a liquid crystal display (LCD) or a cathode ray tube (CRT)). The computer system 1200 may also include an alphanumeric input device 1217 (e.g., a keyboard), a cursor control device 1256 (e.g., a mouse), a disk drive unit 1216, a signal generation device 1299 (e.g., a speaker) and a network interface device 1220.

The disk drive unit 1271 includes a computer-readable medium 1222 on which is stored one or more sets of instructions and data structures (e.g., instructions 1221) embodying or utilized by any one or more of the methodologies or functions described herein. The instructions 1221 may also reside, completely or at least partially, within the main memory 1201 and/or within the processors 1202 during execution thereof by the computer system 1200. The main memory 1201 and the processors 1202 may also constitute machine-readable media.

The instructions 1221 may further be transmitted or received over a network 1226 via the network interface device 1220 utilizing any one of a number of well-known transfer protocols (e.g., Hyper Text Transfer Protocol (HTTP)).

While the computer-readable medium 1222 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

The invention claimed is:

1. A computer-implemented method comprising:
   receiving a first data stream containing information associated with a transaction and participants of the transaction;
   receiving an Artificial Intelligence (AI) algorithm, the AI algorithm being trained to classify the first data stream based on historical information related to the transaction and the participants of the transaction;
   receiving metadata associated with the historical information utilized in training of the AI algorithm;
   comparing the first data stream to the metadata associated with the historical information; and
   based on the comparison, selectively modifying the first data stream to suit the AI algorithm, thereby producing a modified data stream.

2. The computer-implemented method of claim 1, wherein the comparison comprises:
   generating a first metadata based on the first data stream;
   measuring differences between first variables included in the first metadata and second variables included in the metadata associated with the historical information; and
   comparing the differences between the first variables and the second variables to predetermined threshold values.

3. The computer-implemented method of claim 2, further comprising:
   modifying the first data stream to suit the AI algorithm when the differences between the first variables and the second variables are below the predetermined threshold values, thereby producing the modified data stream; and
   classifying the first variables in the modified data stream by the AI algorithm.

4. The computer-implemented method of claim 2, further comprising:
   retraining the AI algorithm based on the first data stream when the differences between the first variables and the second variables are greater than the predetermined threshold values; and
   classifying the first variables in the first data stream by the AI algorithm.

5. The computer-implemented method of claim 1, wherein the modifying includes adjusting averages and standard distributions of the first variables to correspond to the averages and standard distributions of the second variables.

6. The computer-implemented method of claim 1, further comprising automatically converting the first data stream and the historical information into a canonical form.

7. The computer-implemented method of claim 3, further comprising:
   determining behavioral patterns based on the variables classified by the Al algorithm; and
   deploying the behavioural patterns to a transaction server in a continuous data stream to be utilized in business rules of the transaction server.

8. The computer-implemented method of claim 4, further comprising:
   determining behavioral patterns based on the variables classified by the Al algorithm; and
   deploying the behavioural patterns to a transaction server in a continuous data stream to be utilized in business rules of the transaction server.

9. The computer-implemented method of claim 1, further comprising saving the first data stream for a predetermined time to delay classifying of the transaction until transaction feedback is received.

10. The computer-implemented method of claim 9, further comprising retraining the AI algorithm based on the feedback.

11. A computer-implemented system comprising:
    a data stream receiving module to receive
       a first data stream containing information associated with a transaction and participants of the transaction,
       an Artificial Intelligence (AI) algorithm, the AI algorithm being trained to classify the first data stream based on historical information related to the transaction and the participants of the transaction, and
       metadata associated with the historical information utilized in training of the AI algorithm;
    an evaluation module to compare the first data stream to the metadata associated with the historical information; and
    a modifying module to selectively modify the first data stream to suit the AI algorithm based on comparison, thereby producing a modified data stream.

12. The computer-implemented system of claim 11, wherein the comparing module is to generate a first metadata based on the first data stream, to measure differences between first variables included in the first metadata and second variables included in the metadata associated with the historical information, and to compare the differences between the first variables and the second variables to predetermined threshold values.

13. The computer-implemented system of claim 12, wherein the modifying module is to modify the first data stream to suit the AI algorithm when the differences between the first variables and the second variables are below the predetermined threshold values, thereby producing the modified data stream; and a classification module to classify the first variables in the modified data stream by the AI algorithm.

14. The computer-implemented system of claim 12, further comprising:
   a training module to retrain the AI algorithm based on the first data stream when the differences between the first variables and the second variables are greater than the predetermined threshold values; and
   a classification module to classify the first variables in the first data stream by the AI algorithm.

15. The computer-implemented system of claim 11, wherein the modifying module is to adjust averages and standard distributions of the first variables to correspond to the averages and standard distributions of the second variables.

16. The computer-implemented system of claim 11, further comprising a converting module to automatically convert the first data stream and the historical information into a canonical form.

17. The computer-implemented system of claim 13, further comprising:
   the classification module to determine behavioral patterns based on the variables classified by the AI algorithm; and
   a deployment module to deploy the behavioural patterns to a transaction server in a continuous data stream to be utilized in business rules of the transaction server.

18. The computer-implemented system of claim 14, further comprising:
   the classifying module to determine behavioral patterns based on the variables classified by the AI algorithm; and
   the deployment module to deploy the behavioural patterns to a transaction server in a continuous data stream to be utilized in business rules of the transaction server.

19. The computer-implemented system of claim 11, further comprising a saving module to save the first data stream for a predetermined time to delay classifying of the transaction until transaction feedback is received.

20. The computer-implemented system of claim 19, further comprising a training module to retrain the AI algorithm based on the feedback.

21. A machine-readable medium comprising instructions, which when implemented by one or more processors, perform the following operations:
   receive a first data stream containing information associated with a transaction and participants of the transaction;
   receive an Artificial Intelligence (AI) algorithm, the AI algorithm being trained to classify the first data stream based on historical information related to the transaction and the participants of the transaction;
   receive metadata associated with the historical information utilized in training of the AI algorithm;
   compare the first data stream to the metadata associated with the historical information; and
   based on the comparison, selectively modify the first data stream to suit the AI algorithm, thereby producing a modified data stream.

22. An apparatus comprising:
   means for receiving a first data stream containing information associated with a transaction and participants of the transaction;
   means for receiving an Artificial Intelligence (AI) algorithm, the AI algorithm being trained to classify the first data stream based on historical information related to the transaction and the participants of the transaction;
   means for receiving metadata associated with the historical information utilized in training of the AI algorithm;
   means for comparing the first data stream to the metadata associated with the historical information; and
   means for selectively modifying the first data stream to suit the AI algorithm based on the comparison, thereby producing a modified data stream.

* * * * *

UNITED STATES PATENT AND TRADEMARK OFFICE
CERTIFICATE OF CORRECTION

| | | |
|---|---|---|
| PATENT NO. | : 7,930,260 B2 | Page 1 of 1 |
| APPLICATION NO. | : 12/031258 | |
| DATED | : April 19, 2011 | |
| INVENTOR(S) | : Deo et al. | |

It is certified that error appears in the above-identified patent and that said Letters Patent is hereby corrected as shown below:

On Sheet 1 of 12, below Box No. 120, Figure 1, line 2, delete "TRANSACTON' and insert -- TRANSACTION --, therefor.

In column 2, line 48, delete "fall" and insert -- full --, therefor.

In column 12, line 32, delete "FIG. 1100," and insert -- FIG. 11, --, therefor.

In column 14, line 32, in Claim 7, delete "Al" and insert -- AI --, therefor.

In column 14, line 39, in Claim 8, delete "Al" and insert -- AI --, therefor.

In column 16, line 14, in Claim 21, delete "(Al)" and insert -- (AI) --, therefor.

In column 16, line 29, in Claim 22, delete "(Al)" and insert -- (AI) --, therefor.

Signed and Sealed this
Ninth Day of August, 2011

David J. Kappos
*Director of the United States Patent and Trademark Office*